(12) United States Patent
Ge et al.

(10) Patent No.: US 10,553,918 B2
(45) Date of Patent: Feb. 4, 2020

(54) HEAT EXCHANGER FOR BATTERY COOLING

(71) Applicant: NIO NEXTEV LIMITED, Hong Kong (CN)

(72) Inventors: Zengfang Ge, Shanghai (CN); Qi Zhang, Shanghai (CN); Li Ma, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 153 days.

(21) Appl. No.: 15/639,199

(22) Filed: Jun. 30, 2017

(65) Prior Publication Data

US 2018/0006344 A1 Jan. 4, 2018

(30) Foreign Application Priority Data

Jul. 4, 2016 (CN) .......................... 2016 1 0513906

(51) Int. Cl.
*H01M 10/6556* (2014.01)
*H01M 10/613* (2014.01)
(Continued)

(52) U.S. Cl.
CPC ........... *H01M 10/613* (2015.04); *F28F 3/086* (2013.01); *H01M 10/6556* (2015.04); *B60H 2001/00942* (2013.01)

(58) Field of Classification Search
CPC .. H01M 10/613; H01M 10/6556; F28F 3/086; B60H 2001/00942
See application file for complete search history.

(56) References Cited

U.S. PATENT DOCUMENTS

| 8,967,238 B2 * | 3/2015 | Meschke | ................. F28D 9/005 |
| | | | 165/166 |
| 8,999,547 B2 * | 4/2015 | Cha | ....................... H01M 10/65 |
| | | | 429/120 |

(Continued)

FOREIGN PATENT DOCUMENTS

| CN | 203071191 U | 7/2013 |
| CN | 103642959 | 3/2014 |

(Continued)

OTHER PUBLICATIONS

International Search Report and Written Opinion prepared by the Chinese State Intellectual Property Office dated Sep. 20, 2017, for International Application No. PCT/CN2017/090521. (English Translation).

*Primary Examiner* — Ula C Ruddock
*Assistant Examiner* — Thomas H. Parsons
(74) *Attorney, Agent, or Firm* — Sheridan Ross P.C.

(57) ABSTRACT

A heat exchanger for battery cooling is provided to improve an efficiency of cooling of the current heat exchangers. The heat exchanger for battery cooling comprises an upper housing with a fluid inlet and a fluid outlet, a lower housing capable of hermetically connecting with the upper housing to form a chamber for accommodating fluid. The fluid flows into the chamber through the fluid inlet and then exits through the fluid outlet. The fluid chamber is provided with at least one S-shaped fluid directing element with several through holes. With the S-shape directing elements within the fluid chamber and the through holes formed on the directing elements, fluid can flow in an injecting manner within the chamber to realize effective cooling of the upper housing.

8 Claims, 1 Drawing Sheet

(51) Int. Cl.
*F28F 3/08* (2006.01)
*B60H 1/00* (2006.01)

(56) References Cited

U.S. PATENT DOCUMENTS

| 2014/0090813 | A1* | 4/2014 | Schmid | F28F 13/06 |
| | | | | 165/104.19 |
| 2015/0229009 | A1* | 8/2015 | Gruenwald | H01M 10/625 |
| | | | | 429/120 |

FOREIGN PATENT DOCUMENTS

| CN | 103712510 | | 4/2014 |
| CN | 204361212 | U | 5/2015 |
| CN | 204834794 | U | 12/2015 |
| CN | 106099242 | A | 11/2016 |
| CN | 205960155 | U | 2/2017 |
| JP | 2000-173664 | | 6/2000 |

* cited by examiner

HEAT EXCHANGER FOR BATTERY COOLING

CROSS-REFERENCE TO RELATED APPLICATIONS

This application claims the benefit of Chinese Patent Application No. 201610513906.2 filed Jul. 4, 2016, the entire contents of which are incorporated herein by reference.

TECHNICAL FIELD

The present application relates to batteries in new energy vehicles, particularly to a heat exchanger for battery cooling.

BACKGROUND

Nowadays, with increased focus on the development of electric vehicle, battery as the heart of electric vehicle remains a key point of electric vehicle research. The battery of an electric vehicle typically employs the form of power battery pack, which generates a great deal of heat in use, especially during quick charge and discharge and high speed driving. It is necessary to effectively cool the battery pack so that the batteries operate within a proper temperature range. In the prior art, most heat exchangers for battery pack are made by extruding one or two metal plates, which are connected together by soldering or friction stir welding. The inner fluid channels of the exchanger are typically made by stamping or pressing, and fluid flows in the inner chamber mostly in the way of laminar flow, resulting in lower heat exchange coefficient. In addition, the tendency of future development of new energy vehicles is to reduce the weight. In the battery pack system, the research of lighter heat exchanger for battery cooling will help the battery pack system reduce its weight.

In the design of traditional battery cooling plates, they are all made of metallic material. For example, a stamping metal plate and a flat metal plate are connected to one another, enabling fluid to travel through the space between the two plates. To realize electrical insulation, the connected metal plates are covered with plastic film or insulating sheet, which in turn increases the complexity and cost of the battery pack system.

Accordingly, there is a need for a new exchanger to address the previously mentioned problems in the prior art.

SUMMARY OF THE INVENTION

To solve the above described problems in the prior art, i.e., to solve the problems of current heat exchanges being ineffective in dissipating heat, and to further reduce the weight of the exchanges and cut down the cost of installation and usage, a new heat exchanger for battery cooling is provided according to the present invention. The heat exchanger for battery cooling comprises an upper housing with a fluid inlet and a fluid outlet, a lower housing capable of hermetically connecting with the upper housing to form a chamber for receiving fluid. The fluid flows into the chamber through the fluid inlet and exits through the fluid outlet. At least one fluid directing element, which is provided with a plurality of through holes, is disposed within the chamber.

According to an example of the heat exchanger for battery cooling, said at least one fluid directing elements are disposed within the chamber, and the fluid directing elements are configured in S-shape and regularly arranged within the chamber in the fluid flowing direction.

According to an example of the above described heat exchanger for battery cooling, the radius of each through hole is getting smaller in the fluid flowing direction.

According to an example of the above described heat exchanger for battery cooling, the chamber is divided by the fluid directing elements into alternately arranged fluid converging areas and fluid injecting areas, the fluid flows into a fluid converging area first through the fluid inlet and then is injected into the fluid injecting area through the through holes, and finally exits through the fluid outlet after traveling through all directing elements.

According to an example of the above described heat exchanger for battery cooling, the upper housing is of plate-shape structure, and the lower housing includes bottom plate and side walls, and thereby forming a cavity structure with an upper opening.

According to an example of the heat exchanger for battery cooling, both the lower housing and said at least one fluid directing elements are made of plastic and molded together into a single piece.

According to an example of the heat exchanger for battery cooling, the upper housing and the lower housing are hermetically connected with each other by means of adhesive or welding.

According to an example of the heat exchanger for battery cooling, the upper housing is made of aluminum plate or heat conductive plastic.

According to an example of the heat exchanger for battery cooling, the heat exchanger for battery cooling is located under battery modules or between battery modules, with the upper housing staying in contact with the battery modules.

According to an example of the heat exchanger for battery cooling, more than one said heat exchangers can be connected in series or in parallel with each other to form a battery module cooling system.

According to the present application, the directing elements in S-shape are arranged in the chamber and the through holes are formed therein enable the fluid can flow in an injecting manner within the chamber to achieve an effective cooling of the upper housing. Moreover, the lower housing and the fluid directing elements are made of plastic and molded into a single piece, which not only makes the heat exchanger electrically insulated to reduce the usage of insulators in practical application, but also reduces the manufacture cost and at the same time makes the whole battery heat exchanger more robust and much lighter.

DETAILED DESCRIPTION

Figure 1:
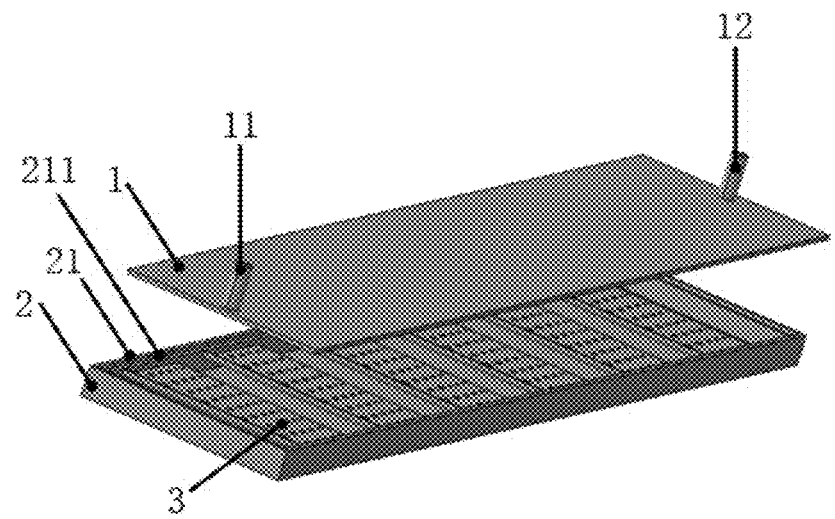
FIG. 1 is a structural schematic illustration of the separated upper and lower housings of the heat exchanger for battery cooling of the present invention.

The preferred embodiments of the invention will be described below with reference to the accompanying figures. As will be understood by those skilled in the art, the embodiments are only used for explaining the technical principle of the invention and are not intended to limit its protection scope. For example, although each member in the figures is drawn to scale, this proportional relation is merely exemplary in nature and can be modified as desired to accommodate specific applications by those skilled in the art.

It should be noted that in the description of the invention, the usage of such directional and positional terms as 'central', 'upper', 'lower', 'left', 'right', 'vertical', 'horizontal', 'inner' and 'outer', is based on the directional and positional relations shown in the drawings, and used to facilitate the description itself and does not express or imply the necessary specific positions or specific operational and structural positions of the devices or elements of the disclosure. Therefore, the usage is not to be understood as limitation on the invention. Additionally, terms 'first', 'second' and 'third' are merely provided for the purposes of description rather than expressing or implying their relative importance.

Moreover, it should also be noted that, in the description of the invention, unless otherwise specified and defined, the terms of 'install', 'connect' and 'couple', should be construed in their broad meaning, which can be understood as permanent or detachable or integrally connecting, mechanically or electrically connecting, direct connecting or indirect connecting via a third part, or even connecting between the inner parts of two elements. Those skilled in the art could interpret the specific meanings of the above mentioned terms based on the context.

As shown in FIG. 1, the heat exchanger for battery cooling according to the present invention comprises an upper housing 1, a lower housing 2 and fluid directing elements 3. As will be described below, the upper housing 1 and the housing 2 can be matched each other, and thereby forming a chamber in which the fluid directing elements 3 are disposed. The upper housing 1, in a plate-like structure, is provided at its top portion with a fluid inlet 11 through which the fluid can flow into the chamber and a fluid outlet 12 through which the fluid can exist from the chamber. According to the embodiment, the fluid inlet 11 and the fluid outlet 12 can be located on other proper positions different from that shown in FIG. 1, such as two opposite corners. Referring to FIG. 1, the two housings 1 and 2 can be hermetically connected with each other to form a chamber inside which fluid can be received. In operation, the fluid enters the chamber through the fluid inlet 11 and exits through the fluid outlet 12. The lower housing 2 includes a bottom plate (not shown in FIG. 1) and side walls 21. The bottom plate and the side walls 21 form a chamber with an upper opening. The side wall 21 is provided with a brim 211 which can cooperate with the upper housing 1 to seal the lower housing 2. Specifically, the brim 211 can be either a flange or groove surrounding the upper portion of the side wall 21 or an edge which is formed due to the thickness of the lower portion of the side wall 21 larger than the upper portion. In a word, the upper housing 1 and the lower housing 2 are configured to match each other such that a hermetic contact is exactly made between the edge of upper housing 1 and the brim 211 of lower housing 2. Further, the upper housing 1 and the lower housing 2 are hermetically connected with adhesive or welding after the hermetic contact between the edge of upper housing 1 and the brim 211 of lower housing 2 is made.

Figure 2:
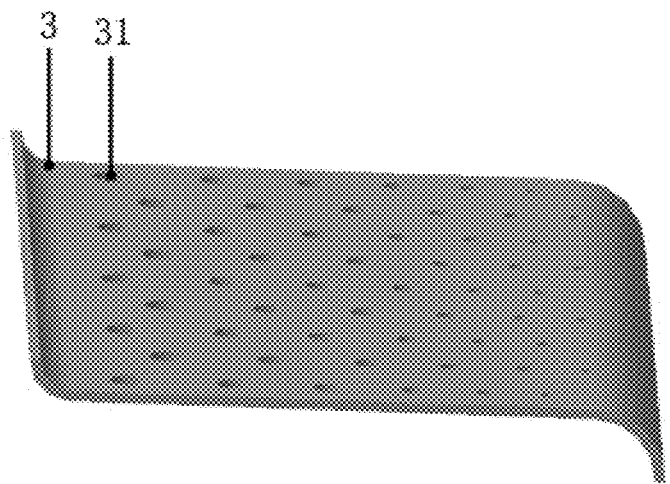
FIG. 2 is an enlarged structural schematic view in which the fluid directing element of the heat exchanger for battery cooling of the present invention is shown.

With reference to FIG. 1 and as previously mentioned, the heat exchanger for battery cooling also comprises fluid directing elements 3. With reference to FIG. 2 which is an enlarged structural schematic view of the fluid directing elements according to the invention, the fluid directing elements 3 are generally configured in S-shape and provided with a plurality of through holes 31 through which the fluid can flow, the radii of the through holes gradually decrease from left to right as shown in FIG. 2. Referring to FIG. 1, the fluid enters the fluid chamber through the fluid inlet 11 and exits through the fluid outlet 12, and the fluid directing elements 3 are regularly disposed within the chamber in the flow direction. As shown in FIG. 1, there are six fluid directing elements 3 arranged in the fluid flowing direction inside the chamber, but it should be understood by those skilled in the art that the embodiment shown in FIG. 1 is simply illustrative and should not be construed as limitations on the structure of the heat exchanger according to the invention. The dimensions, numbers and arrangement of the fluid directing elements 3 can be changed or modified by those skilled in the art to adaptively meet the cooling requirements of batteries under different circumstances. The present invention will be described by taking the arrangement of the six fluid directing elements of the present embodiment as example.

Figure 3:
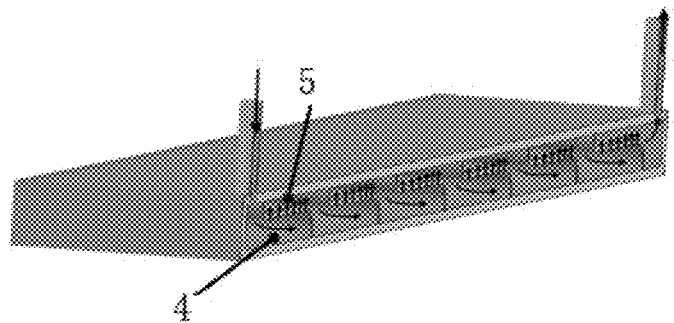
FIG. 3 is a sectional structural schematic illustration of the heat exchanger for battery cooling of the present invention in the direction from the fluid inlet to the fluid outlet, in which the flow and injecting direction of the fluid is shown.

FIG. 3 is a sectional structural schematic illustration of the heat exchanger for battery cooling according to the invention in the direction from the inlet to the outlet. Referring to FIG. 3, the fluid directing elements 3 are regularly disposed in the fluid flowing direction, and thus the fluid chamber is divided into alternately arranged fluid converging areas 4 and fluid injecting areas 5. As shown in FIG. 3, a fluid converging area 4 is formed by a part of the lower housing 2 and a part of a fluid directing element 3 and a corresponding fluid injecting area 5 is formed by a part of the upper housing 1 and another part of the same fluid directing element 3. In such a way, an alternate structure of fluid converging areas 4 and fluid injecting areas 5 is formed. Particularly, as shown by the arrows depicting the fluid flow direction, the fluid enters into the fluid chamber through the fluid inlet 11, converges in a fluid converging area 4, changes its flow direction under the effect of an element 3 and flows through the holes 31 and reaches a corresponding fluid injecting area 5, resulting in forced cooling of the upper housing 1, and then reaches a neighboring converging area 4. Again, the fluid changes its flowing direction under the effect of another fluid directing element 3, and is injected into another fluid injecting area 5 through through holes 31. In this way, the fluid travels through all converging areas 4 and injecting areas 5 to cool the entire upper housing 1 and finally exit through the fluid outlet 12. According to that example, the radii of the fluid directing holes 31 of each fluid directing element 3 gradually decrease in the fluid flowing direction. Therefore the fluid can be evenly injected when passing the directing elements. In practical applications, the radius of each hole 31 can be properly adjusted by those skilled in the art depending on the cooling requirements of the upper housing 1 to guarantee uniform cooling of the upper housing 1.

According to the embodiment as above described, the lower housing 2 and the fluid directing elements 3 can be made of plastic and molded together into a single piece. The lower housing 2 and the fluid directing elements 3 made of plastic are electrically insulating. In addition, the fluid directing elements 3 and the general shape of the lower housing 2 can be realized in one production process, thereby simplifying their manufacture processes and reducing their manufacturing costs. And also, the strength of the entire heat exchanger can be improved by molding the lower housing 2 and the fluid directing elements 3 into a single piece. Further, the upper housing 1 is made of aluminum plate or heat conductive plastic which includes plastic containing metal granules or ceramic particles, leading to effective heat conduction of the upper housing 1.

The heat exchanger of the invention can be used in a battery pack cooling system of a new energy vehicle. In use, the heat exchanger for battery cooling according to the present invention can be located under battery modules, for example, the battery modules are placed on the heat exchanger, or the heat exchanger for battery cooling according to the present invention can be located between the battery modules, with the upper housing 1 in full contact with the modules. Moreover, more than one heat exchangers of the invention can be connected in series or in parallel with each other to form a battery module cooling system.

The technical solutions of the invention have been described with reference to the preferred embodiments shown in the accompanying figures. As will be appreciated by those skilled in the art, however, these specific embodiments are not intended to limit protection scope of the invention. Without departing from the principle of the invention, various changes may be made and equivalents may be substituted for related technical features, the varied or substituted technical solutions will fall within protection scope of the invention.

What is claimed is:

1. A heat exchanger for battery cooling, comprising:
    an upper housing provided with a fluid inlet and a fluid outlet;
    a lower housing capable of hermetically connecting with the upper housing to form a chamber for receiving fluid, wherein the fluid flows into the chamber through the fluid inlet and exits through the fluid outlet,
    wherein at least one fluid directing element, which is provided with a plurality of through holes, is disposed within the chamber, wherein said at least one fluid directing element is configured in S-shape and regularly arranged within the chamber in the fluid flowing direction, and the radius of each through hole is getting smaller in the fluid flowing direction.

2. The heat exchanger for battery cooling according to claim 1, wherein said at least one fluid directing element divides the chamber into alternately arranged fluid converging areas and fluid injecting areas, and wherein the fluid flows into a fluid converging area through the fluid inlet and then is injected into the fluid injecting area through the through holes, and finally exits through the fluid outlet after traveling through all directing elements.

3. The heat exchanger for battery cooling according to claim 2, wherein the upper housing is of plate-shape structure, and the lower housing includes bottom plate and side walls, and thereby forming a cavity structure with an upper opening.

4. The heat exchanger for battery cooling according to claim 3, wherein both the lower housing and said at least one fluid directing elements are made of plastic and molded together into a single piece.

5. The heat exchanger for battery cooling according to claim 4, wherein the upper housing and the lower housing are hermetically connected with each other by means of adhesive or welding.

6. The heat exchanger for battery cooling according to claim 5, wherein the upper housing is made of aluminum plate or heat conductive plastic.

7. The heat exchanger for battery cooling according to claim 1, wherein the heat exchanger for battery cooling is located under battery modules or between battery modules, with the upper housing staying in contact with the battery modules.

8. The heat exchanger for battery cooling according to claim 7, wherein more than one said heat exchangers can be connected in series or in parallel with each other to form a battery module cooling system.

* * * * *